3,014,799
CROSS-LINKING OF HYDROCARBONS
Gerald Oster, 134 W. 11th St., New York, N.Y.
No Drawing. Filed Sept. 20, 1956, Ser. No. 610,903
13 Claims. (Cl. 96—35)

This invention relates to new and useful improvements in the cross-linking of hydrocarbons. The invention more particularly relates to the actinic cross-linking of hydrocarbons, and preferably solid shaped or formed hydrocarbons such as polyethylene, and other polyolefines, and is a continuation-in-part of my copending application Serial No. 554,138, filed December 20, 1955, and now abandoned.

The phenomenon of cross-linking is well-known in the synthetic plastics art, and may be effected, for example, with the use of bi-functional compounds, which join and link together the relatively long macro molecule chains of the synthetic materials. Cross-linking is generally effective in connection with synthetic plastics, such as thermo-setting resins, which are simultaneously formed to their desired shape and polymerized or condensed to their ultimate molecular weight.

In connection with polyolefines such as polyethylene, however, the raw material is first polymerized to its ultimate molecular weight forming the raw polyolefine, which is then shaped into its final form. It is highly undesirable to cross-link the polyolefine during its polymerization or formation, as the same would render the raw material extremely difficult to work up into its ultimate shape or form. Cross-linking, as is well-known, will increase the heat-resistance of the polymer, making the same much more stable against deformation at higher temperatures, and substantially increase the tensile strength thereof. While normal commercial high-pressure polyethylene will have a melting point of, for example, between 105° and 110° C., the cross-linked product will be stable and maintain its shape at temperatures far in excess of this. While this is undesirable in the raw polyethylene, since it renders the same difficult or impossible to further work up, the phenomenon is highly desirable in connection with the final shaped object, as the same will be much more stable and resistant to higher temperatures, stresses, etc. The cross-linking further renders the polyethylene more resistant to solvents. Thus, for example, normal, high-pressure polyethylene will dissolve in hot hydrocarbons, such as benzene, toluene, xylene, and the like, whereas the cross-linked product will at most swell in these solvents. The increased resistance to heat and solvents is also achieved in connection with the cross-linking of other hydrocarbons, such as other polyolefines, paraffins, microcrystalline waxes, etc.

The field of application of the hydrocarbons such as the polyethylene thus could be greatly extended by the cross-linking of the shaped objects formed therefrom. Wires and cables insulated with the cross-linked hydrocarbons could be subjected to much higher temperatures and have much greater tensile strength than cables and wires presently coated with the commercially available material. Tubes, conduits, and containers of cross-linked material could be used in connection with fluids at much higher temperatures and pressures than similar articles made of the presently commercially available material, and could be used, for example, in connection with liquid, such as hydrocarbons, which would normally dissolve the conventional material. The various extended uses and applications of such cross-linked, temperature-resistant, high-strength hydrocarbons, are, of course, obvious to the skilled artisan.

Additionally, fibers of the cross-linked hydrocarbons such as the polyethylene could be woven or otherwise formed into fabrics, which would be resistant to laundering and ironing, whereas conventional polyethylene, due to its relatively low melting point and tensile strength at these temperatures, does not lend itself to this application.

It has recently been proposed to cross-link the formed polyethylene with the use of ionizing radiation, such as gamma rays, X-rays, high energy electrons, or alpha particles. The use of such ionizing radiation, however, is relatively expensive, extremely difficult to control, and does not lend itself to commercial application. In addition to the high expense of the equipment required for the ionizing radiation, the operation of the same requires highly skilled technicians, and generally involves hazards to personnel, requiring maintenance of cumbersome and expensive safeguards. This can well be appreciated when it is realized that dosages of many million Roentgen units are required for the cross-linking, whereas small dosages of, for example, 100 Roentgen units, are considered dangerous to human life.

One object of this invention is the actinic cross-linking of hydrocarbons, which may be effected in an extremely simple manner without the above-mentioned disadvantages. These, and still further objects, will become apparent from the following description:

In accordance with the invention, I have discovered that relatively low-energy ultraviolet radiation, having a wave length between about 300 and 170 millimicrons, is extremely effective in cross-linking hydrocarbons. Some degradation will be caused by radiation below about 200 millimicrons. This degradation may not and does not outweigh the beneficial effects of the cross-linking for some purposes, but may, however, become severe in the presence of oxygen.

The term "hydrocarbons" as used herein is intended to designate any organic material having a substantially saturated pure hydrocarbon structure, such as hydrocarbon in gaseous, liquid or solid form, such as oils, waxes, paraffins, microcrystalline waxes and polyolefins, i.e., material derived from hydrocarbons having one or more olefinic bonds and especially mono-olefines, such as polyethylene, polypropylene, etc., and the like.

All of the starting hydrocarbons are characterized by a saturated hydrocarbon chain. While the physical characteristics of these various hydrocarbons may vary from one another, these differences are caused by the molecular weight of the hydrocarbon chain and the manner of branching of the chain and not by a basic difference in chemical composition.

The hydrocarbon cross-linked in accordance with the invention is preferably in solid form, and may include any of the known or commercially available solid polyethylenes or other polyolefines. The hydrocarbon is preferably in the form of a shaped object, as, for example, in the form of a sheet, foil, tube, insulation surrounding a wire, tape, bottle, container, or any other shaped or formed object.

Since in many cases a substantial portion of the ultraviolet radiation is absorbed in the hydrocarbon prior to substantial penetration, in these cases if the entire mass of the object is to be cross-linked, the solid object should not have a thickness or depth from a surface which may be radiated of substantially more than one-half inch. If thicker objects are subjected to the process of the invention, the characteristics are still improved, since the surface layer to a depth of up to about one-half inch will be cross-linked. In this connection, in certain applications it may be desirable to so cross-link the surface, while the interior remains un-cross-linked.

The radiation may be effected with any ultraviolet light source, capable of producing radiation in a range between about 170 and 300 millimicrons and preferably 200 to 300 millimicrons. In this connection, any of the commercially available ultraviolet lamps may be used which produce radiation in this range. These lamps include the carbon arc lamps and preferably carbon arc lamps with cobalt carbon cores as obtainable from the National Carbon Company or low pressure mercury vapor resonance lamps. A particularly economical and suitable lamp has been found to be the commercially available low pressure mercury vapor resonance germicidal lamps which are often provided with filters cutting out radiation below about 200 millimicrons to prevent ozone formation. In connection with carbon arc lamps, care should be taken to prevent undue heating of the hydrocarbons. Many commercially available mercury vapor lamps, such as the high-pressure and medium-pressure lamps which are often used as sources for actinic radiation are, however, not suitable as the same do not produce any substantial radiation in the range below about 310 millimicrons or are provided with envelopes which cut out this radiation. Additionally, of course, ordinary sunlight is not effective as the atmosphere filters out radiation below the 300 millimicron range. I have discovered that the wave length range above about 300 millimicrons is at best only about $\frac{1}{500}$ as effective for cross-linking as the 200–300 millimicron range with the same number of quanta absorbed.

In the presence of oxygen, radiation below about 200 millimicrons may cause a severe degradation. If the irradiation is, therefore, effected in the presence of oxygen such as air, care preferably should be taken to filter out radiation below about 200 millimicrons so that the same does not exceed more than about 25% of the total effective radiation below 300 millimicrons. Filters for this purpose are of course well-known in the art and commercially available. Thus, for example 43% acetic acid solution may be used or any of the commercially available glass filters such as filter sold under the trade name of Vycor 791 or the Corning glass No. 9863.

The cross-linking may be effected with an extremely low energy out-put, and an extremely low dosage. Thus, for example, effective cross-linking of 2 mm. thick polyethylene sheets has been achieved with an 8-watt, low-pressure mercury vapor germicidal lamp 20% efficient in producing radiation in the 200–300 millimicron range in as short a time as 15 minutes. The exposure time may, of course, be substantially decreased by using a source of higher intensity, and, for example, the cross-linking may be effectively achieved in a flash of millisecond duration, using, for example, a mercury vapor lamp, into which a bank of condensers is discharged.

The particular intensity of radiation and exposure time will depend on the material being treated and the effect desired, and may be easily determined by the artisan. The radiation should be effected for a period of time sufficient to effect some cross-linking, which may easily be determined by the infra-red absorption, or, even more simply, by the relative solubility of the hydrocarbon in hot solvents, such as toluene, or resistance to thermal distortion. An extremely easy test for polyethylene is determined by placing polyethylene in toluene having a temperature of about 90° C. Polyethylene which is not cross-linked will dissolve in toluene and precipitate upon cooling, whereas cross-linked polyethylene will not dissolve but may swell. The resistance to heat-distortion of the material may easily be determined by placing the same in boiling glycerine. At the temperature of the boiling glycerine, i.e., about 290° C., for example, uncross-linked commercial polyethylene becomes severely distorted, while this distortion is markedly decreased, depending upon the degree of cross-linking.

The degree of cross-linking is dependent upon the amount of ultraviolet energy in the effective range absorbed by the hydrocarbons. This, of course, in turn, is dependent upon the energy output of the source in this effective range, the distance of the source from the hydrocarbon, the duration of exposure, and the absorption characteristics of the particular hydrocarbon.

The source of the actinic energy for the cross-linking is extremely convenient for treating hydrocarbons of the most varied shapes and sizes. Thus, for example, in connection with polyethylene sheets, the same may be passed over cylindrical mercury vapor lamps in the manner of rollers or the like. In connection with tubes or other hollow members, specially shaped mercury vapor lamps may be provided, which may be inserted in the interior, or which surround the exterior for the exposure. In connection with elongated objects, an annular light source may be provided, through the center of which the elongated object is passed. Thus, for example, in order to cross-link polyethylene surrounding a wire or cable as an insulation, it is possible to pass the polyethylene through the center of a doughnut-shaped or helical mercury vapor lamp, or to pass the same past a bank of mercury vapor lamps surrounding the wire or past a single mercury vapor lamp with rotation of the wire.

Upon studying the ultraviolet absorption spectrum of the hydrocarbons, such as polyethylene, which show cross-linking upon exposure to the ultra violet light within the effective wave length, I have noted that absorption occurs within this effective wave length and that accompanying this absorption a photolysis occurs which converts the absorbing components to non-absorbing components within the effective range. Certain hydrocarbons such as in highly purified form which show practically no absorption to the ultra violet in this range will not respond and will not cross-link.

I have discovered that the addition of certain activators to the hydrocarbon will increase the cross-linking response to the ultra-violet radiation many-fold and will further allow the hydrocarbons which will not normally absorb or sufficiently absorb ultraviolet light to be cross-linked by the irradiation.

These activators constitute organic materials which show ultra violet absorption within the effective range, i.e., at a wave length between 170 and 300 millimicrons and preferably between 300 and 200 millimicrons and which undergo photolysis to a non-ultra violet absorbing material within said range with a quantum efficiency of $10^{-2}$ to unity. These activators include organic materials which contain a carbonyl group preferably connected to an aromatic nucleus, a disulfide group or a diphenylamine group. Therefore, in accordance with a preferred embodiment of my invention I irradiate the hydrocarbons with the ultra violet light in the effective range in the presence of the activator. The activator may be added to the hydrocarbon in any desired amount. If, for example, the hydrocarbon is in liquid form, a simple mixing of the activator with the same will suffice. In connection with solid hydrocarbons such as polyethylenes, the activator may be milled with the material while hot or the polyethylene may be immersed in the activator if liquid or in a solution of the activator in a suitable solvent as, for example, cyclohexane.

The amounts of the activator used do not appear critical and even mere traces appear to be effective. The effect of a particular activator depends upon its absorption characteristics within the effective range and its quantum efficiency. In general, however, amounts of more than 1% by weight based on the hydrocarbon should not be used though in certain cases larger amounts may be permissible. The small amounts of the sensitizers are additionally preferable as large amounts may cause swelling and decrease the overall rate of cross-linking. Additionally, the use of smaller amounts is preferred to insure destruction by the radiation since residual quantities remaining may tend to serve as an oxidation accelerator and initiator in the presence of higher wave length radiation as, for example, occur in ordinary sunlight. In this connection it is interesting to note that irradiation of the hydrocarbon containing the activator with ultra violet radiation in the normal actinic range of above 300 millimicrons will tend to cause severe destructive oxidation. For this reason radiation with the medium and high pressure mercury vapor lamps, such as the General Electric sun lamps or the H4 type mercury lamps, should be avoided.

Examples of activators which have proven particularly suitable include diphenylamine which is particularly suitable as the same additionally serves as an anti-oxidant, benzildisulfide, a c e t o p h e n o n e and benzophenone. Amounts of these activators of the order of magnitude of 0.1–1% increase the speed of cross-linking by a factor of up to 5,000.

While certain aromatic compounds such as benzene, toluene and xylene in their commercially available form show activity as the activators when the same are purified, as, for example, by being passed in contact with silica gel, the activating effect is very substantially reduced.

The dosage of the ultra violet radiation required to give a particular cross-linking effect varies in the individual cases depending upon the individual activators used. In general, with all other conditions remaining equal, the radiation dosage to give a particular cross-linking effect decreases with the increasing crystallinity of the hydrocarbons and with increasing molecular weight of the hydrocarbons.

The cross-linking of normally gaseous saturated hydrocarbons in accordance with the invention will result in an increase of the apparent molecular weight and often results in the conversion of the gas to a liquid.

The cross-linking of the normally liquid hydrocarbon oils in accordance with the invention will substantially increase the viscosity of the same or convert the same into solid form.

The cross-linking of the normally solid hydrocarbons greatly increases the resistance to temperature deformation at increased temperature and resistance to solvents at increased temperature. The cross-linking also greatly increases the resistance of the material such as polyethylene to stress corrosion. While uncross-linked solid hydrocarbons normally have a definite melting point range, the cross-linked product will not melt and will withstand temperatures up to their decomposition temperature. The paraffins and waxes, due to their greater temperature resistance and resistance to solvents at increased temperatures, are highly useful as coating, as for example on containers of paper or the like.

The cross-linked polyolefins, such as the polyethylenes and polypropylenes, have highly desirable characteristics as compared to the uncross-linked product.

The cross-linked polyethylene produced in accordance with the invention has a much greater resistance to deformation at increased temperature than the uncross-linked product. The cross-linked polyethylene will be stable at temperatures above 200° C., whereas the uncross-linked product will melt at temperatures between about 100°–135° C. and deform at somewhat lower temperatures. The tensile strength of the cross-linked product is substantially increased as compared to that of the uncross-linked product, while the major portion of the flexible characteristics is retained, though the cross-linked product is slightly more rigid than the untreated material. The cross-linked product, however, has none of the brittle characteristics which were previously encountered in connection with cross-linking effected by ionizing radiation. The cross-linked product is relatively insoluble in most organic solvents, even at elevated temperatures, and retains most of the desirable characteristics of conventional polyethylene, including the high electrical break-down strength and low dielectric loss.

Since the cross-linked solid hydrocarbons such as polyethylene, produced in accordance with the invention, are insoluble in hot organic solvents, such as toluene, and, since the conventional products prior to the irradiation are soluble in these solvents, the process of the invention lends itself to the formation of forms and images on the hydrocarbon by irradiating the same with ultra violet light having variations in intensity corresponding to the image to be formed. After the irradiation, the uncross-linked portions may be washed out and removed with the hot organic solvent, whereas the irradiated cross-linked portions will remain. In this manner the process of the invention may be used in reproducing various images and reproductions, such as photographic images, in the same manner as described in my co-pending application Serial No. 531,284, filed August 29, 1955, except that in place of the visible light images, ultra violet images in the effective wave length ranges specified are used and that the uncross-linked portions which correspond to the unpolymerized portions of my co-pending application are removed by washing with hot organic solvents, such as hot toluene.

While the invention is primarily intended for the cross-linking of the hydrocarbons in the form of solid bodies or masses, the same is, of course, also applicable for the cross-linking of the same in other forms, as, for example, the forms of melts or emulsions or dispersions in a vehicle which will not absorb the ultra violet radiation, as for example, distilled water. The cross-linking of such emulsions or dispersions will give special effects when the same are used to form surface coatings or coverings.

The invention will be further described with reference to the examples which follow below, which are given by way of illustration and not limitation. The lamps used in the examples, unless otherwise specified, have an efficiency of about 30% and will emit about 90% of the radiation in the 200–300 millimicron wave length range.

*Example 1*

A sheet of commercial polyethylene, having a molecular weight of about 20,000 and a thickness of about 1 mm., was positioned at a distance of about 5 inches from a 15 watt, low-pressure germicidal lamp, which contained a glass envelope, which filtered out the wave lengths below about 200 millimicrons. The lamp emitted about 90% of its irradiation in a range of 254 millimicrons. About 80% of the irradiation which struck the polyethylene was absorbed. The irradiation was continued for a period of about 7 hours. After the irradiation, the irradiated sample was placed in hot toluene, having a temperature of about 90° C. and was completely insoluble even after a prolonged period of time. As contrasted to this, the same sheet of polyethylene, which had not been irradiated, rapidly dissolved in this hot toluene. The irradiated polyethylene showed an increase in the infra-red absorption at 10.35 microns as compared with the unirradiated polyethylene, and showed an increase in tensile strength of almost double that of the original material.

*Example 2*

Example 1 was repeated, except that a polyethylene sheet of 1 mm. thickness, and having a molecular weight of about 40,000 was used. Upon irradiating with the same low-pressure germicidal lamp at the same distance, it was found that only half the exposure time was necessary to produce the same degree of cross-linking as determined by the insolubility in toluene and the infra-red absorption. This indicates that the irradiation dosage necessary to obtain a given effect varies inversely with the molecular weight of the polyethylene.

*Example 3*

Example 1 was repeated, but, prior to the irradiation, the sheet of polyethylene was dipped in a cold 5% solution of benzophenone in spectrally pure cyclohexane. The excess solution was then allowed to drain off and the polyethylene was allowed to dry prior to the irradiation. It was found that only 5 minutes' exposure was necessary to obtain the same cross-linking effect as required 7 hours in Example 1, as determined by the degree of swelling in the hot toluene and the resistance to deformation at increased temperatures.

Example 4

A 500 cc. beaker formed of polyethylene (molecular weight of about 20,000), having a wall thickness of 3 mm., was irradiated with a 35 watt, low-pressure mercury vapor lamp, the bulb of which was in the form of a helix and which was provided with a quartz envelope. The lamp was surrounded by a quartz test tube containing 43% solution of acetic acid in water to filter out the wave lengths below 200 millimicrons. The irradiation was effected by first placing the helical bulb with its filter inside the beaker for a period of 24 hours. Thereafter the outer surface of the beaker was irradiated by rotating the beaker with the lamp at a distance of 4 inches for 24 hours. The resulting material showed no heat distortion when allowed to stand in glycerine at 290° C. for 1 hour, whereas an identical beaker, which had not been irradiated in the manner described, completely lost its shape and flattened out in hot glycerine at 200° C.

Example 5

A 30 watt, low-pressure mercury vapor lamp was attached through a heavy-duty mechanical switch to a bank of condensers, totalling 30 micro-farads and charged with 8000 volts. A sheet of polyethylene, having a molecular weight of about 20,000 and a millimeter thick was placed a distance of about 6 inches from the lamp. The heavy-duty mechanical switch was closed, resulting in a short burst of light from the lamp having a duration of less than a thousandth of a second. After this flash irradiation, the sheet was placed in hot toluene, having a temperature of 90° C., and, while the same swelled, there is no tendency to dissolve, indicating cross-linking. The sheet further showed resistance to deformation when heated in hot glycerol to a temperature of 290° C.

The cross-linking effect of this instantaneous burst of light was further amplified by repeating the experiment but wetting the polyethylene prior to the irradiation with acetone, dibenzyldisulfide and diphenylamine, respectively.

Example 6

A sheet of polyethylene, having a molecular weight of about 20,000 and a thickness of about ⅓ millimeter was placed around an 8 watt, low-pressure, mercury germicidal lamp, so as to completely surround the lamp. Irradiation was allowed to proceed for various lengths of time. It was found that 15 minutes of irradiation is sufficient to show evidence of cross-linking as determined by insolubility in hot toluene, having a temperature of 90° C. Further time of irradiation gave samples which showed increasing greater resistance to swelling in hot toluene.

A further sheet of the identical polyethylene was dipped in a benzophenone solution in cyclohexane and allowed to dry. After irradiation for various lengths of time, it was found that the benzophenone treated material had characteristics of the material not treated with the benzophenone and which had been irradiated for at least 3000 times longer with the identical source at the same distance. The same results were obtained when diphenylamine and acetophenone were substituted for the benzophenone.

Example 7

A commercially available electric wire was coated with 1 mm. thickness high density polyethylene (known under the trade name of Marlex 50), into which 1% by weight of benzophenone had been milled. The wire was then passed through the center of a helically-shaped, 30 watt, low-pressure germicidal lamp. The wire was passed at a rate of speed so that each portion remained within the helical bulb for a period of about 1 second. After the irridation, the polyethylene coating was insoluble in hot toluene at a temperature of 90° C., whereas the coating on the unirradiated wire dissolved off. A piece of the irradiated wire was connected in parallel with a piece of the unirradiated wire, and a current was passed through both pieces, so that the wires heated up. The polyethylene coating on the unirradiated wire was noted to deform and melt off, whereas the coating on the irradiated wire remained intact and showed no deformation and retained its electrical resistance.

Example 8

High density Ziegler polyethylene (Hifax) filaments were spun from the melt through platinum spinnerets and wound into threads of 40 deniers. A piece of fabric was woven from the threads in the conventional manner. The fabric was cut into pieces and one piece was irradiated with a 30 watt, commercial germicidal mercury vapor lamp for a period of 3 hours at a distance of 1 foot. After the irradiation, a piece of the fabric was placed in hot toluene at 90° C. alongside a piece of the unirradiated fabric, until the unirradiated fabric dissolved. The irradiated piece remained intact.

A commercial electric pressing iron was allowed to heat to a surface temperature of about 250° C. A piece of irradiated fabric was folded in half and pressed on a conventional ironing board with the iron. The iron slipped over the fabric with no apparent detrimental effect. When a piece of unirradiated fabric was ironed in an identical manner, the material fused and stuck to the iron and was completely destroyed.

By immersing a piece of the polyethylene fabric in acetone and removing the excess prior to the irradiation and irradiating for 10 minutes, the same results were obtained.

Example 9

A commercial polyethylene tube, having an inner diameter of about 4 inches and a wall thickness of about ¼ inch, was irradiated with a 30 watt germicidal lamp by passing the lamp through the center of the tube, so that each portion was exposed to the ultra violet radiation for about 10 minutes. The polyethylene tube was formed by extruding a polyethylene powder into which 0.5% by weight of diphenylamine had been milled. The irradiation was effected prior to the cooling of the extruded tube at a point where the tube was still relatively optically clear. At the same time the outer surface of the tube was irradiated with a similar lamp encircling the tube so that each portion of its surface was irradiated for about 10 minutes at a distance of about ¹⁄₁₆ inch from the tube. Thereafter the tube was connected to a boiler tank and the free end plugged. Steam was allowed to generate in the boiler and pass into the tube to a pressure of about 40 pounds per square inch guage. The tube withstood the steam pressure with no apparent damage or deformation. An identical tube, which had not been irradiated, was substituted for the irradiated tube, and immediately upon the generation of the steam and the passage of the steam into the tube, deformed and burst.

Example 10

A printing plate of electrolytically pure copper was evenly coated with molten polyethylene into which .5% benzophenone had been incorporated by dipping the plate in a molten bath of benzophenone. The coating was allowed to solidify and was thereafter irradiated through a photographic negative on a quartz glass backing in the manner of contact printing with one flash of the 35 watt, low-pressure mercury vapor lamp provided with the condenser source as described in Example 5. After the irradiation, the polyethylene surface was washed with hot toluene at a temperature of about 68° C. The unirradiated portion corresponding to the opaque portions of the photographic negative washed out, exposing the electrolytic copper surface of the plate. Thereafter the plate was etched in the conventional etching bath, the remaining cross-linked polyethylene corresponding to the exposed portions protected the plate from the etching acid. After the etching, the cross-linked polyethylene was burnt off the plate with an ordinary blow torch, and the plate used for relief printing. A positive ink reproduction of the negative image was reproduced upon the printing.

In the same manner an intaglio printing plate was produced, using a photographic positive image on the quartz glass plate in place of the photographic negative image.

Example 11

A glass bottle was uniformly coated with molten polyethylene and thereafter the polyethylene was allowed to harden. The polyethylene-coated bottle was dipped in molten benzophenone, the excess benzophenone wiped off and the bottle allowed to dry. A cardboard stencil having lettering thereon was placed on the polyethylene-coated surface and the surface was irradiated through the stencil for 5 minutes with a 30-watt commercial germicidal mercury vapor lamp. After the irradiation, the stencil was removed and the bottle immersed in a beaker of toluene having a temperature of about 59° C. The polyethylene which had not been cross-linked by the ultra violet radiation corresponding to the opaque portions of the stencil were washed away, leaving the bottle coated with cross-linked polyethylene corresponding to the cut-out portions of the stencil. Thereafter, the bottle was subjected to a conventional glass etching, using hydrofluoric acid, so that the glass corresponding to the opaque portions of the stencil were etched, whereas portions corresponding to the cut-out portions of the stencil containing the cross-linked polyethylene, were protected from the etching acid. After the etching operation, the cross-linked polyethylene was peeled off, leaving a finely etched bottle. In place of the stencil, a photographic positive on a backing which will transmit ultra violet light, having wave length between 200 and 300 millimicrons could be used and in this manner very fine etchings obtained.

Example 12

A slab of commercial polyethylene, having a thickness of about 1 inch, was irradiated with a photopositive image on an ultra violet light-transmitting backing, using a 30 watt, low-pressure germicidal lamp as the light source. Irradiation was effected in about 5 hours at a distance of about 3 inches from the surface. After the irradiation, the surface was lightly wiped with hot toluene having a temperature of about 80° C. Wiping with the hot toluene caused the unirradiated portions of the polyethylene slab which were not cross-linked to be wiped away, leaving a relief image corresponding to the photographic positive.

If the experiment is repeated, additionally uniformly irradiating the back side of the slab with the germicidal lamp for about 20 hours, a cross-linked base of about half an inch thickness will be formed, so that, instead of wiping the surface, the entire block may be immersed in hot toluene, leaving the relief cross-linked image on the cross-linked base.

Example 13

A gaseous hydrocarbon mixture consisting predominantly of $C_1$–$C_4$ saturated hydrocarbons and obtained from the cracking of natural petroleum oil was fed into a sealed test tube so that the same displaced the air. The test tube additionally contained several drops of acetone so that the gas mixture became saturated with the acetone vapor. The test sube was irradiated at a distance of 3 mm. with a 30 watt low-pressure germicidal lamp for 24 hours. The formation of an oil-like precipitate could be noted.

Example 14

A $C_7$–$C_{10}$ saturated and substantially straight chain hydrocarbon oil fraction derived from a petroleum refined neutral oil distillate is mixed with 1% by weight of benzophenone in a thin transparent quartz glass tube. The tube was irradiated with a 30 watt low-pressure germicidal lamp at a distance of 10 millimeters. After about a minute and a half a very slight thickening of the oil could be noted. On further irradiation the viscosity increased and a solid material precipitated out. This solid material is of wax-like consistency and is insoluble in toluene.

Example 15

A Fischer-Tropsch derived paraffin having a softening point of about 40° C. in which about 0.5% by weight of benzophenone had previously been melted was irradiated with a 30 watt low-pressure germicidal lamp at a distance of about a half a centimeter. After about 15 minutes of radiation, the wax was infusible and insoluble in hot hydrocarbon solvents such as xylene and toluene. A paper coated with this wax material prior to the irradiation and thereafter irradiated in the identical manner could be formed into a container which could hold normal solvents for the hydrocarbon such as benzene, xylene, toluene, hexane or the like.

Example 16

A microcrystalline wax was melted and about 1% benzophenone was incorporated into the melt. After solidification the material was irradiated with a 30 watt, low-pressure mercury germicidal lamp at a distance of about a half a centimeter for 4 hours. The wax was insoluble in all the known normal solvents for the same even at elevated temperatures and was heated up to its temperature of decomposition without melting.

Example 17

A microcrystalline wax was melted and about 1% of diphenylamine was incorporated in the melt. The melt was brushed on a metal etching plate and allowed to solidify. Thereafter the plate was irradiated through a stencil by means of a 30 watt, low-pressure germicidal mercury vapor lamp at a distance of about 5 cm. for 1 hour. Thereafter the wax coating was washed with hexane so that the unirradiated portions were washed out leaving the metal exposed for etching.

Example 18

A 5% solution of benzophenone in cyclohexane was brushed on one side of a 2 mm. thick polyethylene sheet of low density polyethylene. This side was irradiated with a 30 watt, low-pressure, germicidal mercury vapor lamp for one second. Thereafter the sheet was placed in hot toluene at room temperature for 5 minutes. The sheet curled in the form of a cylinder with the irradiated portion on the inside. When deformed, the cylinder would quickly snap back to its cylindrical form. This may be used for forming various surface effects on sheet polyethylene and similar materials or from fabrics woven from this material.

Example 19

Example 18 was repeated except that the sheet was coated on both sides with the benzophenone and irradiated for one minute on each side. Thereafter the sheet was placed in a solution of hot toluene having a temperature of about 90° C. The uncross-linked center portion of this sheet dissolved out leaving the same hollow and thus forming a fine tube.

Example 20

Commercially available polypropylene having a melting point of about 160° C. was milled with about 1% of benzophenone while in the molten state. The polypropylene was then hot rolled in the form of a sheet and the sheet irradiated with a 30 watt germicidal, low-pressure, mercury vapor lamp at a distance of about 5 cm. for about one hour. Thereafter the sheet was reheated at temperatures far in excess of 160° under strain without showing deformation or melting.

*Example 21*

High pressure Ziegler-type polyethylenes (Hifax) was melted in a quartz glass test tube at a temperature of about 140° C. About 0.5% by weight of benzophenone was added and mixed with the melt. The melt had a much greater optical clarity than the solidified material. The test tube with the polyethylene was then irradiated for 2 hours with a 30 watt low-pressure germicidal mercury lamp at a distance of about 5 cm. while maintaining the polyethylene at the initial melting temperature. Some solidification of the melt could be noted during the irradiation. After the irradiation the material was cooled to room temperature and the solid material was optically modified as compared with the initial solid polyethylene.

*Example 22*

A monofilament of high density polyethylene was cold-drawn so that the same formed a neck. The filament was then dipped in a 5% solution of benzophenone in spectrally pure cyclohexane. The excess benzophenone was wiped off and the filament allowed to dry. The filament was then irradiated for 10 minutes with a 15 watt low-pressure mercury vapor germicidal lamp at a distance of about 10 cm. The cold-drawn filament showed cross-linking as indicated by insolubility in hot toluene.

I claim:

1. Process for the cross-linking treatment of solid hydrocarbons which comprises irradiating a solid, substantially saturated, substantially uncross-linked hydrocarbon with ultra-violet light, having a predominate portion of its effective ultra-violet intensity in the wave length range between about 170 and 300 millimicrons, in the presence of an organic cross-linking activator selected from the group consisting of benzophenone, diphenylamine, acetone, benzildisulfide and acetophenone, and capable of absorbing ultra-violet light within said wave length range with photolysis to a non-ultra-violet absorbing compound in said range with a quantum efficiency between about $10^{-2}$ and unity said quantum efficiency referring to the number of activator molecules photolyzed to non-ultra-violet light absorbing form per quantum of light absorbed, until said hydrocarbon shows a substantial increase in its resistance to solvents and temperature distortion.

2. Process according to claim 1 in which said ultra-violet light has a predominate portion of its effective ultra-violet intensity in the wave length range between 200 and 300 millimicrons.

3. Process according to claim 2 in which said hydrocarbon is a solid polyolefin.

4. Process according to claim 1 in which said irradiation is effected with ultra-violet light having variations in intensity corresponding to a graphic image.

5. Process according to claim 4 which includes washing out the unirradiated and uncross-linked portions of the hydrocarbon with a solvent after said irradiation.

6. Process according to claim 1 in which said activator is present in amount of less than about 1% by weight based on said hydrocarbon.

7. Process according to claim 1 in which said irradiation is effected with ultra-violet light having a predominate portion of its effective ultra-violet intensity in the wave-length range between 200 and 300 millimicrons while substantially filtering out any irradiation having a wave length below about 200 millimicrons.

8. Process for the production of graphic images which comprises irradiating the surface of a solid, saturated, substantially uncross-linked hydrocarbon with ultra-violet light having a predominant portion of its effective ultra-violet intensity in the wave-length range between 170 and 300 millimicrons and variations in intensity corresponding to the image to be formed, in the presence of an organic, cross-linking activator selected from the group consisting of benzophenone, diphenylamine, acetone, benzildisulfide, and acetophenone, and capable of absorbing ultra-violet light within said wave length range with photolysis to a non-ultra-violet light absorbing compound in said range with a quantum efficiency between about $10^{-2}$ and unity, said quantum efficiency referring to the number of activator molecules photolyzed to non-ultra-violet light absorbing form per quantum of light absorbed, to thereby cross link the portions of the hydrocarbon surface subjected to the higher intensity ultra-violet light, and thereafter washing uncross-linked portions from said surface with a solvent capable of dissolving the uncross-linked hydrocarbons and in which the cross-linked hydrocarbon is substantially insoluble.

9. Process according to claim 8 in which said solvent is a hot hydrocarbon.

10. Process according to claim 9 in which said solvent is hot toluene.

11. Process according to claim 8 in which said hydrocarbon surface is the surface of a hydrocarbon forming a coating on an etchable backing plate.

12. Process according to claim 1 in which said cross-linking activator is benzophenone.

13. Process according to claim 8 in which said cross-linking activator is benzophenone.

References Cited in the file of this patent

UNITED STATES PATENTS

| | | |
|---|---|---|
| 2,484,529 | Roedel | Oct. 11, 1949 |
| 2,760,863 | Plambeck | Aug. 28, 1956 |
| 2,849,504 | Kong et al. | Aug. 26, 1958 |
| 2,882,324 | Schmerling | Aug. 14, 1959 |
| 2,892,712 | Plambeck | June 30, 1959 |
| 2,902,365 | Martin | Sept. 1, 1959 |

FOREIGN PATENTS

Barnes et al.: General Electric Review, vol. 42, No. 12, pp. 540–43, December 1939.

Chapiro: "Comptes Rendus," vol. 229 (1949), p. 827.

Charlesby: "Proceedings of Royal Society," vol. 215 (1952), pp. 187–214.

Oster et al.: Journal Polymer Science, vol. 34, pp. 671–684, January 1959.